United States Patent
Cho

Patent Number: 6,157,849
Date of Patent: *Dec. 5, 2000

[54] METHOD FOR CONTROLLING BACK LIGHT BY USING CLOCK FUNCTION IN PORTABLE RADIO COMMUNICATION TERMINAL

[75] Inventor: Byung-Duck Cho, Seoul, Rep. of Korea

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/996,542

[22] Filed: Dec. 23, 1997

[30] Foreign Application Priority Data

Dec. 23, 1996 [KR] Rep. of Korea ............... 96-70556

[51] Int. Cl.⁷ ................ H04B 1/38; G09G 3/36
[52] U.S. Cl. ............. 455/566; 455/569; 345/102
[58] Field of Search ................ 455/566, 569, 455/575; 345/168, 169, 170, 102; 379/368, 369, 370, 428, 433; 341/22, 31, 27

[56] References Cited

U.S. PATENT DOCUMENTS

| | | | |
|---|---|---|---|
| 4,142,312 | 3/1979 | Stokes | 40/336 |
| 4,339,632 | 7/1982 | Early et al. | 379/355 |
| 4,491,693 | 1/1985 | Sano et al. | 379/156 |
| 4,536,761 | 8/1985 | Tsunoda et al. | 340/825.44 |
| 4,982,424 | 1/1991 | Saito et al. | 455/566 |
| 5,019,747 | 5/1991 | Morita et al. | 315/157 |
| 5,212,810 | 5/1993 | Maeda et al. | 455/528 |
| 5,235,636 | 8/1993 | Takagi et al. | 379/368 |
| 5,379,319 | 1/1995 | Satoh et al. | 379/387 |
| 5,546,457 | 8/1996 | Tomura et al. | 379/368 |
| 5,570,421 | 10/1996 | Morishima | 379/396 |
| 5,881,377 | 3/1999 | Giel et al. | 455/343 |
| 5,894,298 | 4/1999 | Hoeksma | 345/102 |
| 5,894,580 | 4/1999 | Yoshida | 713/340 |
| 5,933,088 | 8/1999 | Lipp . | |

FOREIGN PATENT DOCUMENTS

| | | | |
|---|---|---|---|
| 0 275 193 A2 | 7/1988 | European Pat. Off. | H04M 1/22 |
| 6-14090 | 6/1992 | Japan . | |

*Primary Examiner*—Nguyen Vo
*Assistant Examiner*—Charles N. Appiah
*Attorney, Agent, or Firm*—Dilworth & Barrese

[57] ABSTRACT

A method for reducing power consumption in a portable radio communication terminal by selectively preventing back light operation using daylight hours. The portable radio communication terminal checks whether current time of the timer is within a predetermined period of daytime. If the current time is within the period of daytime, the portable radio communication terminal is set to a back light-off mode. In this condition, if key data is received, the portable radio communication terminal manages the key data without turning on the back light. Therefore, it is possible not only to extend an operating time of the battery but also to prevent an increase of the temperature due to the heat radiation of the portable radio communication terminal.

3 Claims, 3 Drawing Sheets

METHOD FOR CONTROLLING BACK LIGHT BY USING CLOCK FUNCTION IN PORTABLE RADIO COMMUNICATION TERMINAL

BACKGROUND OF THE INVENTION

1. Field of the Invention

The present invention relates to a method for controlling a back light in a portable radio communication terminal, and in particular, to a method for controlling the back light by using a clock function in a portable radio communication terminal.

2. Description of the Related Art

A portable radio communication terminal generally has a back light function to offer convenience to the user, when used in a dark condition. Referring to FIG. 1, a portable radio communication terminal having the back light function includes a display 10, a keypad 20, and a back light composed of a plurality of light emitting diodes (LEDs) 30.

FIG. 2 illustrates a known schematic block diagram of a back light control device. With reference to the drawing, a controller 100 controls the overall operation of the portable radio communication terminal. The controller 100 is a one-chip microprocessor having a ROM (read only memory) into which a control program is stored, and a RAM (random access memory) into which data generated in the course of executing the control program is temporarily stored. A timer 600 for performing a clock function displays current time on the display 10 under the control of the controller 100. A keypad 200 is composed of a number of numeric keys and function keys to generate key data when any one of a plurality of keys is depressed by the user. The key data generated is provided to the controller 100. A counter 300 begins counting the time under the control of the controller 100, and provides the controller 100 with a control signal after a lapse of a predetermined time. A power controller 400, connected to the controller 100, provides a back light 800 with a supply voltage under the control of the controller 100. The back light 800 is composed of a plurality of LEDs.

FIG. 3 illustrates a flow chart for controlling the back light control device shown in FIG. 2 according to the prior art. Now, referring to FIGS. 2 and 3, if the user operates the keypad 200, controller 100 checks at step 510 whether key data is received from the keypad 200. If the key data is received, the power controller 400 provides the back light 800 with the supply voltage under the control of the controller 100 at step 520, so as to turn on the back light 800. Thereafter, controller 100 enables counter 300 at step 530. The counter 300 provides the controller 100 with a counting completion signal after a lapse of a predetermined time. If the counter 300 generates the counting completion signal at step 540, the power controller 400 will cut off the supply voltage being supplied to the back light 800, under the control of the controller 100, at step 550, so as to turn off the back light 800. However, if the counter 300 has not generated the counting completion signal at step 540, the procedure will return to step 520 to repeat the foregoing steps 520 to 540.

Further, the portable radio communication terminal uses a battery to supply the power. Thus, it is very important to reduce a power consumption of the portable radio communication terminal so as to extend an operating time of the battery.

TABLE 1

| Operating Mode | Current Consumption (Vcc = 5 V) | Remarks |
| --- | --- | --- |
| Stand-by | 10–50 mA | Rx Status |
| Max. Output Tx. | 300–500 mA | Tx and Rx Status |
| Back light | 200–250 mA | 10 LEDs Used |

Table 1 expresses current consumptions of the portable radio communication terminal according to various operating modes, in which one LED consumes about 20 mA in a back light mode. It can be noted from Table 1 that the power consumption in the back light mode is much higher than that in the stand-by mode. Generally, the portable radio communication terminal is commonly used in a bright condition rather than in a dark condition.

However, upon receiving any key data, the conventional back light control device turns on the back light unconditionally, thereby wasting the power unnecessarily in the daytime. Thus, the operating time of the battery may be undesirably reduced. In particular, when the portable radio communication terminal is installed in a hands-free kit, the back light is always turned on even if the user does not operate the keypad, which causes unnecessary power consumption and a heat radiation during the daytime.

SUMMARY OF THE INVENTION

It is therefore an object of the present invention to provide a method for turning off a back light during the daytime by using a clock function in a portable radio communication terminal.

To achieve the above and other objects, a method for controlling a back light by using a clock function in a portable radio communication terminal having a keypad and a timer for performing the clock function, includes the steps of: checking whether the current time of the timer is within a predetermined time period; setting a back light-off mode when the current time is within the predetermined time period; and managing received input key data without turning on the back light.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF PREFERRED EMBODIMENTS

Figure 1:
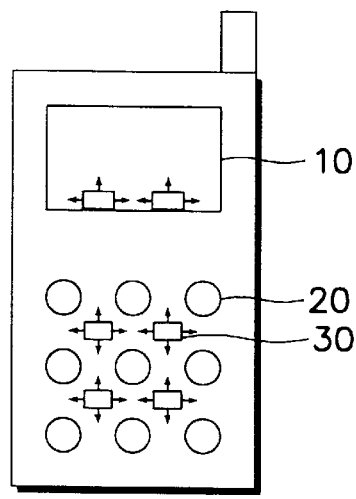
FIG. 1 is a front view of a portable radio communication terminal having a back light function.

A preferred embodiment of the present invention will be described in detail referring to the attached drawings, in which the like reference numerals denote the same elements in the drawings, for understanding. Though the specific embodiments will be exemplarily defined and described in detail to clarify the subject matter of the present invention, the present invention may be implemented with the description of the present invention by those skilled in the art even without the details. In addition, any unnecessary description of widely known functions and constructions in the art have been avoided.

Figure 2:
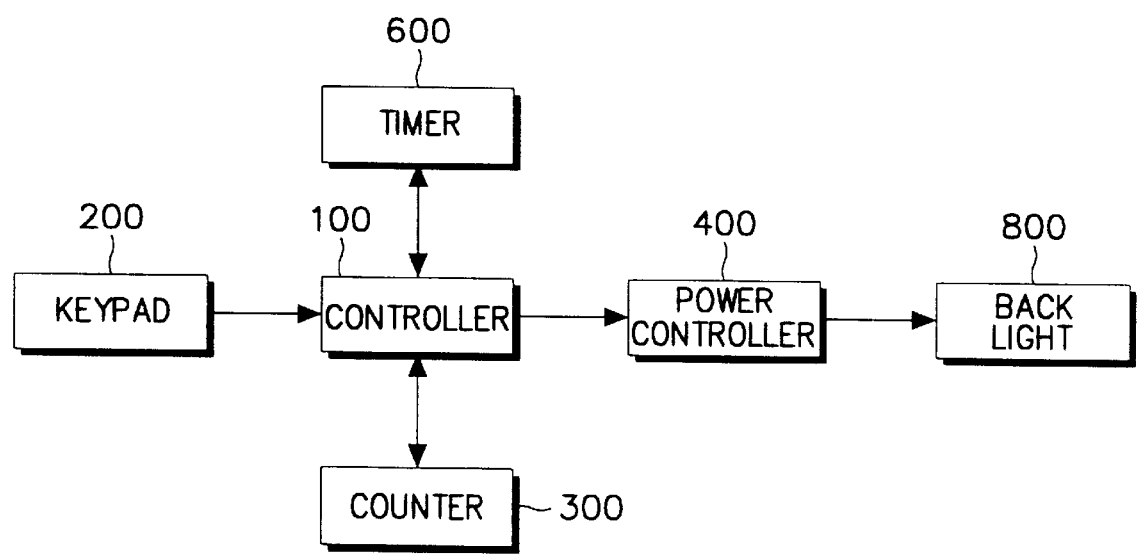
FIG. 2 is a schematic block diagram of a back light control device according to the prior art.
Figure 3:
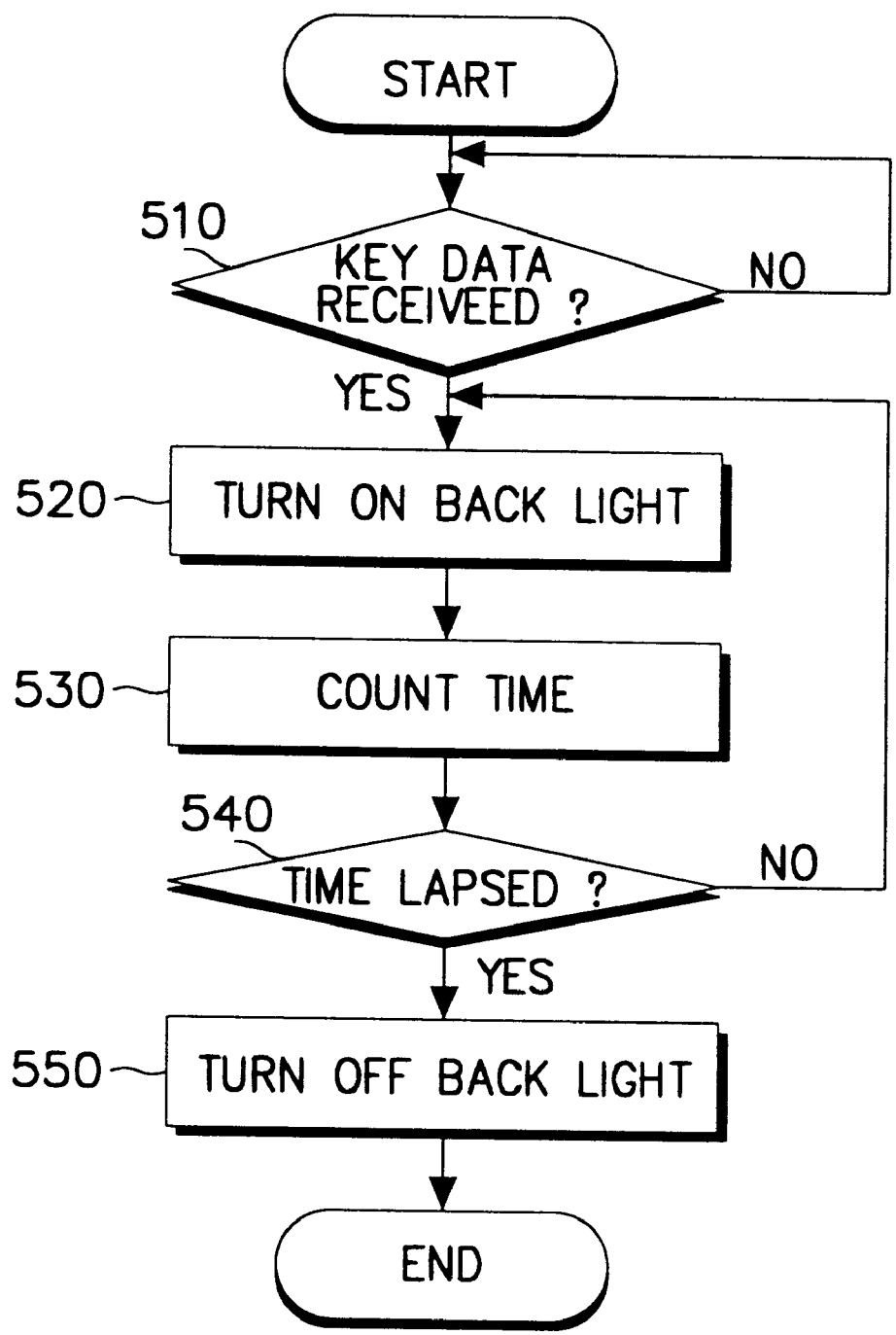
FIG. 3 is a flow chart for controlling a back light according to the prior art.
Figure 4:
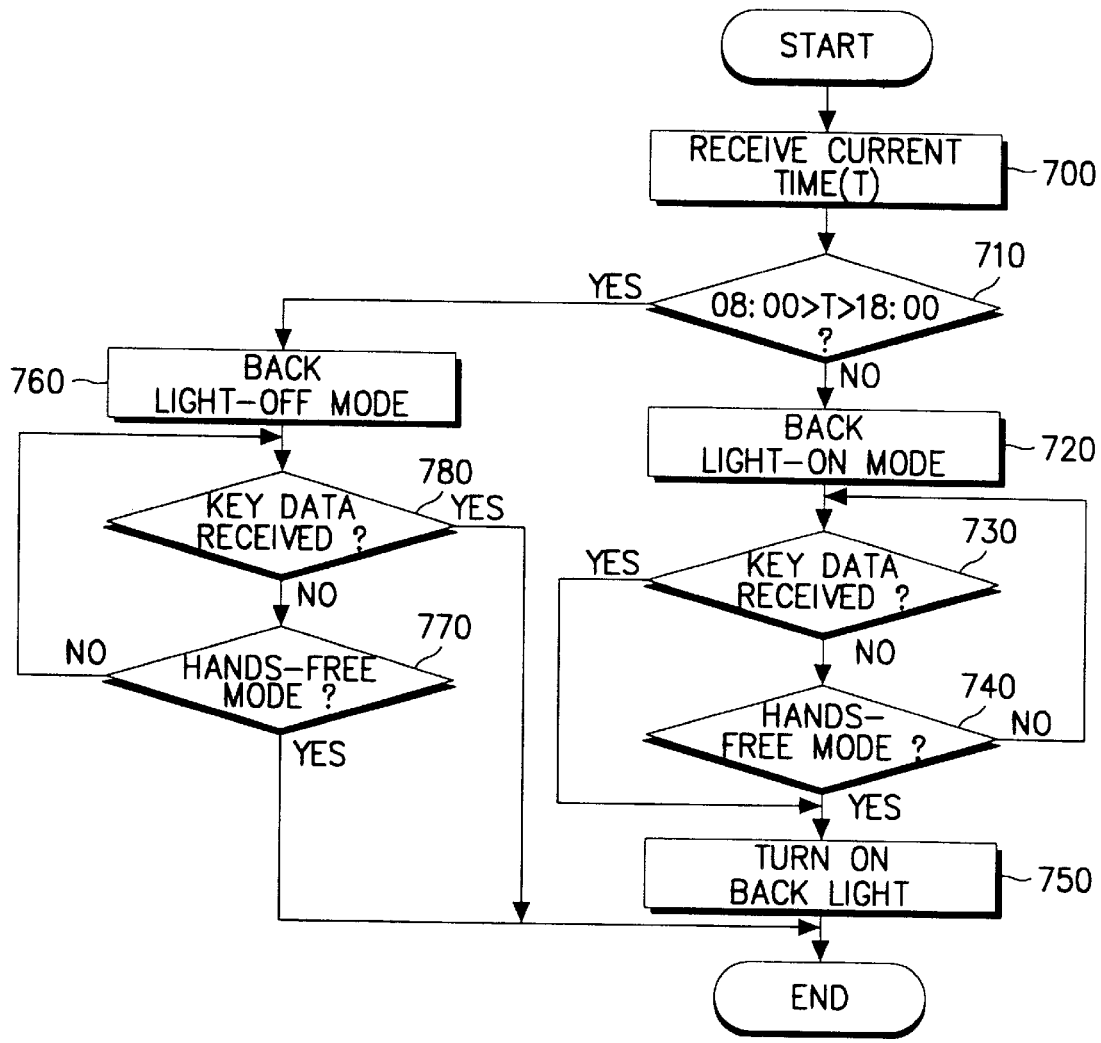
FIG. 4 is a flow chart for controlling a back light according to a preferred embodiment of the present invention.

Now, referring to FIGS. 2 and 4, descriptions will be made on a procedure for controlling a back light by using a clock function according to a preferred embodiment of the present invention. At a step 700, the timer 600 provides controller 100 with current time T. The controller 100 checks, at step 710, whether the current time T is within a time period of daytime or daylight hours (e.g., a time period between 8 a.m. and 6 p.m.). The user may freely change a definition of the daytime, at their discretion. If the current time is not within the time period between 8 a.m. and 6 p.m., the controller 100 sets a back light-on mode at step 720. In the meantime, if the user operates the keypad 200, controller 100 checks whether key data is received from the keypad 200 (step 730). If the key data is received, the power controller 400 provides the back light 800 with the supply voltage under the control of controller 100, to turn on the back light 800 (step 750). If the key data is not received at step 730, controller 100 checks whether the portable radio communication terminal is installed in a hands-free kit and thereby operating in a hands free mode (step 740). If the portable radio communication terminal is installed in the hands-free kit, controller 100 turns on the back light 800 at step 750.

If the current time is determined at step 710 to be within the time period between 8 a.m. and 6 p.m., controller 100 sets a back light-off mode at step 760. In the interim, if the user operates the keypad 200, controller 100 manages the key data input without turning on the back light at step 780. Further, even if the portable radio communication terminal is installed in the hands-free kit at step 770, controller 100 will not turn on the back light 800.

As can be clearly appreciated from the foregoing descriptions, the portable radio communication terminal of the invention turns off the back light during the daytime to reduce the power consumptions. Therefore, it is possible not only to extend the operating time of the battery but also to prevent an increase of temperature due to the heat radiation of the portable radio communication terminal.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for controlling a back light in a portable radio communication terminal having a keypad with a plurality of keys, and a timer for performing a clock function, comprising the steps of:

determining whether current time of the timer is within a predetermined time period;

automatically determining whether the portable radio terminal is operating in a hands-free mode:

setting a back light-off mode when the current time is within said predetermined time period;

managing input key data which is generated by depressing any one of the plurality of keys on the keypad, without turning on the back light during the back light-off mode and/or during the hands-free mode;

setting a back light-on mode when the current time is not within said predetermined time period;

turning on the back light upon receiving the input key data during the back light-on mode; and turning on the back light when the portable radio terminal is operating in the hands-free mode during the back light-on mode.

2. The method according to claim 1, wherein said predetermined time period is a time period of daytime.

3. The method recited in claim 1, comprising the additional step of setting a back light-off mode when the current time is within said predetermined time period and the portable radio terminal is operating in the hands-free mode.

* * * * *